(12) United States Patent
Zhu et al.

(10) Patent No.: US 7,903,821 B2
(45) Date of Patent: Mar. 8, 2011

(54) METHOD FOR MANAGING KEY IN MULTIMEDIA BROADCAST AND MULTICAST SERVICE

(75) Inventors: Yanmin Zhu, Beijing (CN); Hong Wang, Beijing (CN); Xiaoqiang Li, Beijing (CN)

(73) Assignees: Samsung Electronics Co., Ltd (KR); Beijing Samsung Telecom R&D Center, Beijing (CN)

( * ) Notice: Subject to any disclaimer, the term of this patent is extended or adjusted under 35 U.S.C. 154(b) by 595 days.

(21) Appl. No.: 11/667,909

(22) PCT Filed: Nov. 16, 2005

(86) PCT No.: PCT/KR2005/003880
§ 371 (c)(1),
(2), (4) Date: May 16, 2007

(87) PCT Pub. No.: WO2006/054860
PCT Pub. Date: May 26, 2006

(65) Prior Publication Data
US 2008/0009274 A1 Jan. 10, 2008

(30) Foreign Application Priority Data
Nov. 16, 2004 (CN) .......................... 2004 1 0092587

(51) Int. Cl.
*H04L 9/08* (2006.01)
(52) U.S. Cl. ......... 380/281; 380/277; 380/278; 380/279; 380/283; 713/153; 713/171; 370/328; 370/329; 370/338; 370/349; 455/410; 455/411

(58) Field of Classification Search .................. None
See application file for complete search history.

(56) References Cited

U.S. PATENT DOCUMENTS
7,055,030 B2 * 5/2006 Negawa ................. 713/163
(Continued)

FOREIGN PATENT DOCUMENTS
KR 1020050018232 2/2005
(Continued)

OTHER PUBLICATIONS

"3GPP TS 33.246 V6.0.0—3rd Generation Partnership Project; Technical Specification Group Services and System Aspects; Security; Security of Multimedia Broadcast/Multicast Service (Release 6)", Sep. 2004.*

(Continued)

*Primary Examiner* — Ian N Moore
*Assistant Examiner* — Alexander Lagor
(74) *Attorney, Agent, or Firm* — The Farrell Law Firm, P.C.

(57) ABSTRACT

A method for managing key in Multimedia Broadcast/Multicast service comprising steps of defining a valid MTK ID interval for each generated MSK and sends it to a UE along with a MSK by a BMSC; after receiving the MSK, saving a valid MTK ID interval of the MSK by the UE; and defining a MTK ID for each generated MTK encrypted with the MSK and sending the MTK ID and the MTK to the UE after encrypting them with the MSK by the BMSC This MSK is valid only when the transmission of the MTK within MTK ID interval is in operation. Therefore, once the UE finds out that some newly received MTK's MTK ID is beyond said MTK ID, it deletes the MSK that is applied in said MTK transmission's encryption correspondingly.

5 Claims, 3 Drawing Sheets

U.S. PATENT DOCUMENTS

| | | | |
|---|---|---|---|
| 7,392,382 B1 * | 6/2008 | Weis et al. | 713/163 |
| 2003/0070092 A1 * | 4/2003 | Hawkes et al. | 713/201 |
| 2004/0120527 A1 * | 6/2004 | Hawkes et al. | 380/277 |
| 2005/0026607 A1 | 2/2005 | Hwang et al. | |
| 2005/0220064 A1 * | 10/2005 | Hundscheidt et al. | 370/342 |
| 2007/0223703 A1 * | 9/2007 | Verma et al. | 380/278 |

FOREIGN PATENT DOCUMENTS

| | | |
|---|---|---|
| KR | 1020050076433 | 7/2005 |

OTHER PUBLICATIONS

Xu, Wenyuan; Trappe, Wade; Paul, Sanjoy, "Key management for 3G MBMS security", GLOBECOM'04, IEEE Global Telecomunications Conference, Nov. 29, 2004.*

"MBMS MSK management", Samsung Electronics, 3GPP TSG SA WG3 Security, Oct. 26, 2004.*

* cited by examiner

METHOD FOR MANAGING KEY IN MULTIMEDIA BROADCAST AND MULTICAST SERVICE

BACKGROUND OF THE INVENTION

1. Field of the Invention

The present invention relates to Multimedia Broadcast/Multicast service (hereinafter referred to as MBMS), especially to a method for managing key in MBMS.

2. Description of the Related Art

MBMS is a new service under standardization by 3G Mobile Communication System Partnership Project. MBMS service is a unidirectional point-to-multipoint (p-t-m) (i.e. multimedia data sent from a single data source are transferred to multiple users through network transmission) service. The most remarkable feature of this service is that it can make use of radio resources and network resources efficiently.

The MBMS service is mainly used in wireless communication network system, e.g. Wideband Code-Division Multiple Access system, Global System of Mobile Communication, etc.. MBMS service data transmission basically includes following several steps, i.e. data source transmission, middle network transmission, destination cell on-the-air transmission and user reception.

FIG. 1 is a logical figure for network devices of the radio communication system that can provide MBMS service, in which MBMS actually makes use of General Packet Radio Data Service (hereinafter referred to as GPRS) as core transmission network.

As shown in FIG. 1, a Broadcast/Multicast service Center (hereinafter referred to as BM-SC) is a data source for MBMS data transmission; a Gateway GPRS Supporting Node (hereinafter referred to as GGSN) is used to connect the GRPS network with external network, such as INTERNET, In MBMS service, the Gateway GPRS Supporting Node connects to the BM-SC and sends MBMS data to a specific Service GPRS Supporting Node (hereinafter referred to as SGSN); a Cell Broadcast Center is the data source of cell broadcast.

Through interconnecting Cell Broadcast Center with BM-SC in MBMS, the Cell Broadcast Center can provide MBMS service promotion function; the SGSN is used to perform access control on a UE as well as mobility management, and sends MBMS data from the GGSN to a specific Radio Network Controller (hereinafter referred to as RNC) at the same time; a RNC is used to control a group of base stations and sends multimedia data to a specific base station; The base station (hereinafter referred to as Node-B) establishes an in-the-air data transmission channel for MBMS service in a certain cell under the control of the RNC; Terminal User Equipment (hereinafter referred to as UE) is a terminal equipment for MBMS data reception.

For the considerations of charging and safety, etc., it is usually necessary to perform encryption to MBMS service's data transmission so as to make the data effective only for those users who can receive. Because the MBMS is a kind of point-to-multipoint service and in order to utilize the radio resources and network resources effectively, the keys applied in MBMS data encryption are just the same for all of a group of users receiving the same kind of MBMS service. Thus, the users needn't obtain different keys for their roaming within the service range of this MBMS service. Generally, the BMSC takes charge of such tasks as key generation, key management and key assignment. In order to make it safer and to prevent key from divulging, it is necessary for the BMSC to often change the key for data encryption.

Since it is possible that much more users share the same MBMS service, e.g., for certain football match that is in live broadcast, it is possible that hundreds of users in the same cell are watching this match, each user wants to obtain this key and each user's key transmission must occupy definite system resources. Therefore, a two-level encryption mechanism is adopted in the MBMS service to guarantee that the key can be updated for every user in time and no excessive system resource will be occupied in the meantime.

Firstly, the BMSC generates an MBMS service key (hereinafter referred to as MSK) for each MBMS service. This MSK is kept unchanged within a comparatively long period of time. Each user who joins in a certain MBMS service will receive an MSK, the transmission and update of which are done in the point-to-point mode and via the dedicated channel allocated for the user. Each MSK mentioned above has an ID, which is jointly composed of a Network ID, a Key Group ID and a MSK ID and every MSK is uniquely identified by said ID. Here, the Network ID is 3 bytes long, which indicates in which operator's network the key is applied; the Key Group ID is 2 bytes long and it is used to perform grouping management on keys for the convenience of deleting keys that are no longer needed to save; and the MSK ID is 2 bytes long. It is used to distinguish different MSKs that have identical Network ID and Key Group ID. In the existing MBMS services, the MSK ID increases by degrees corresponding to each update of MSK.

Secondly, the BMSC generates a MBMS data key that varies in real time (hereinafter referred to as MTK), which varies very fast. The BMSC transfers the MTK through a common channel shared by many users in virtue of the point-to-multipoint mode after it is encrypted with the MSK. Each user who has joined in this service can decrypt this information with the received MSK to obtain the currently applied MTK. Each MTK mentioned above also has an ID, which is jointly composed of a Network ID, a Key Group ID, a MSK ID and a MTK ID and the MTK is uniquely identified by the ID. Here, the MTK ID is 2 bytes long and used to distinguish different MTKs whose Network ID, Key Group ID and MSK ID are identical respectively. In the existing MBMS services, the MTK ID increases by degrees corresponding to each update of the MTK.

In the MBMS services, the MSK is kept unchanged only within a comparatively long period of time. In fact, it also needs update. In the existing system, after receiving a new MSK, the UE will delete the old one that is saved inside the UE and has the same Network ID, Key Group ID but different MSK ID as that of the newly received one. Similarly, after receiving a new MTK, the UE will delete the old one that is saved inside the UE and has the same Network ID, Key Group ID, MSK ID but different MTK ID as that of the newly received one.

Within the 24 hours of a day, the load of a mobile communication system varies along with the change of time. Generally, in daytime, it is necessary for the mobile communication system to provide people with voice conversation, data services, etc., the load of the mobile communication system is comparatively heavy; while at night, the load of the mobile communication system is comparatively light. Thus in the services that the MBMS can provide, there exists the following service mode: at night, when the load of the system is comparatively light, a certain MBMS service's encrypted multimedia data is transmitted to the UE; while in daytime, when a certain user is interested in this service and accordingly joins in, the system transmits the several MSKs to the UE for decryption.

Under that service mode, if the existing key management method is still adopted in the system, then when the UE receives many MSKs at a time, it can only save the last received MSK with the largest MSK ID but none of the many MSKs that have smaller MSK IDs and have the same Network ID, Key Group ID as that of the saved one. In fact, these MSKs with smaller MSK IDs are needed for later MTK's decryption. In this way, the UE will delete these MSKs that are actually needed to be saved.

SUMMARY OF THE INVENTION

An object of the present invention is to provide a method for managing key in Multimedia Broadcast and Multicast Service effectively.

To achieve the object mentioned above, there provides a method for managing key in Multimedia Broadcast/Multicast service comprising steps of:

defining a valid MTK ID interval for each generated MSK and sends it to a UE along with a MSK by a BMSC;

after receiving the MSK, saving a valid MTK ID interval of the MSK by the UE; and defining a MTK ID for each generated MTK encrypted with the MSK and sending the MTK ID and the MTK to the UE after encrypting them with the MSK by the BMSC.

In order to make the UE manage the keys accurately and to avoid useful MSK's deleting by mistake, a valid MTK ID transmission interval should be defined for each MSK that is applied in MTK transmission's encryption. This MSK is valid only when the transmission of the MTK within the MTK ID interval is in operation. Therefore, once the UE finds out that some newly received MTK's MTK ID is beyond the MTK ID, it can delete the MSK that is applied in the MTK transmission's encryption correspondingly. In particular, this valid MTK ID transmission interval can be defined as an interval composed of all possible MTK IDs except some specific one, for example, "0". According to the method for managing key presented in the present invention, both the BMSC and the UE can accurately and conveniently carry out key management.

DETAILED DESCRIPTION OF THE PREFERRED EMBODIMENTS

An effective method for managing key is provided for Multimedia Broadcast/Multicast service in the present invention. It comprises the following steps: the BMSC defines one valid MTK ID interval for each generated MSK and sends it to the UE along with MSK.

In addition, after the UE receives the MSK, it saves the MSK's valid MTK ID interval.

In addition, the BMSC defines one MTK ID for each generated MTK encrypted with the MSK and sends the MTK ID and the MTK to the UE after they have been encrypted with the MSK.

In addition, after the UE receives a certain MTK, it checks whether the received MTK's MTK ID is in the interval of the MTK ID corresponding to the MSK used for decryption or not. If so, the UE accepts this MTK; otherwise, the UE deletes this saved MSK and accepts or refuses this MTK.

The present invention relates to an effective method for managing key in Multimedia Broadcast/Multicast service; In fact, a valid MTK ID transmission interval is defined for each MSK that is applied in MTK transmission's encryption. This MSK is valid only when the transmission of the MTK within the MTK ID interval is in operation. In this way, once the UE finds out that some newly received MTK's MTK ID is beyond the MTK ID, it deletes the MSK that is applied in the MTK transmission's encryption correspondingly so as to achieve the object of valid and effective key management. As shown in Figures, an embodiment according to this invention is described in the following. To avoid making the description of the application be too tedious, detailed descriptions for well known functions or equipments are omitted.

Figure 1:
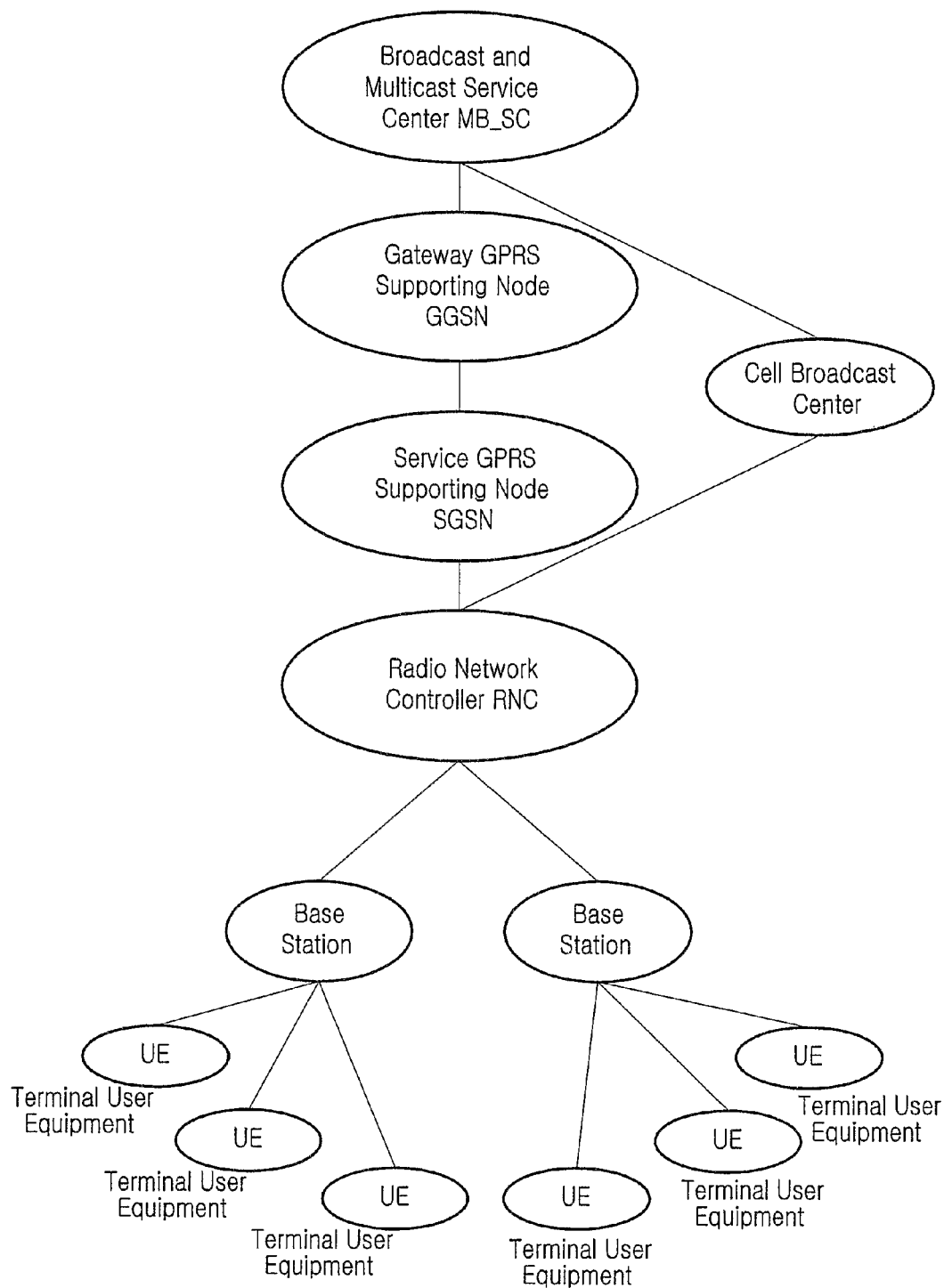
FIG. 1 is a logical figure for network devices of the radio communication system that can provide MBMS service.
Figure 2:
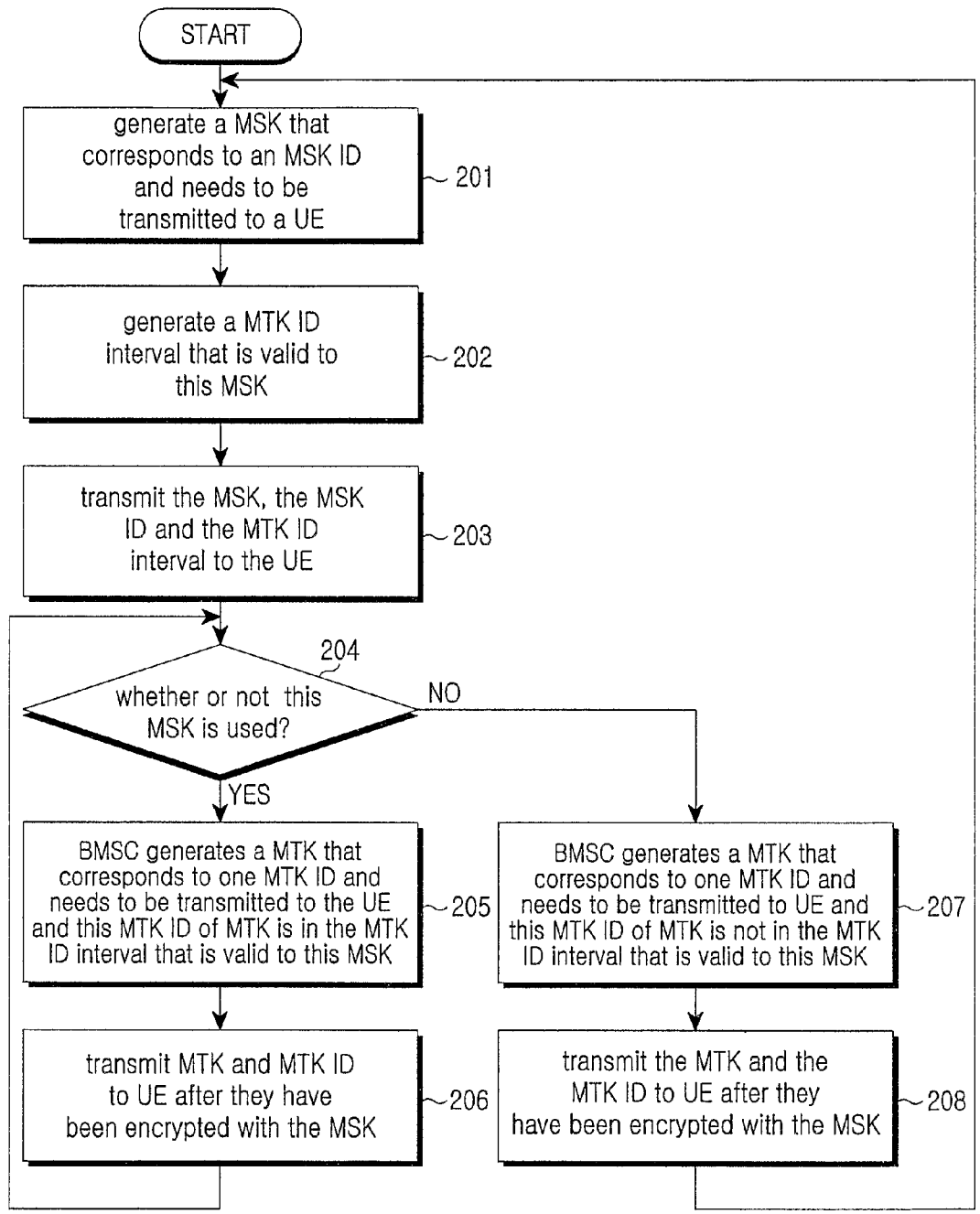
FIG. 2 shows an operation flow of key management performed by a BMSC according to one embodiment of the present invention.
Figure 3:
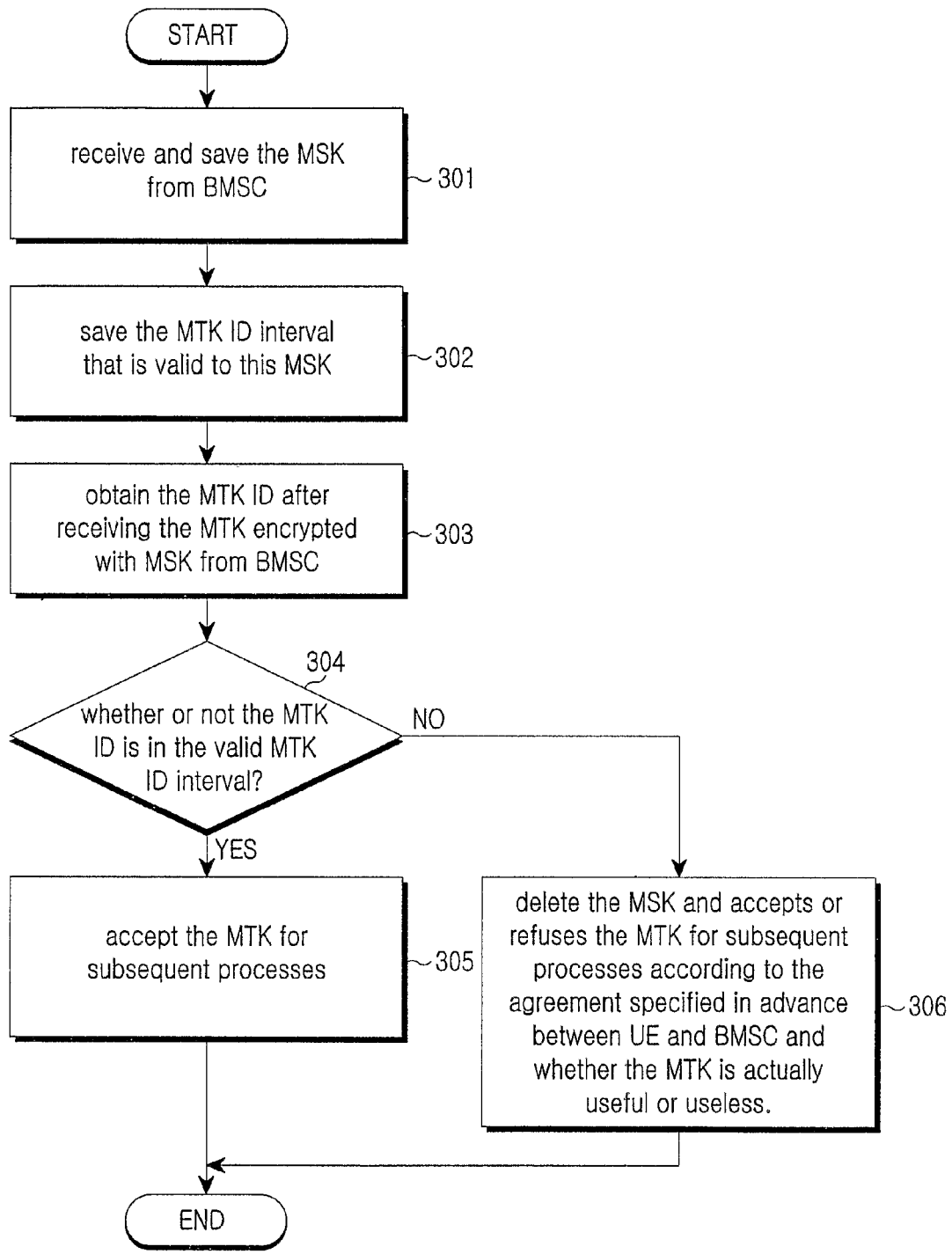
FIG. 3 is an operation flow chart of key management performed by a UE corresponding to FIG. 2.

FIG. 2 shows an operation flow of key management performed by a BMSC according to one embodiment of the present invention. FIG. 3 is an operation flow chart of key management performed by a UE corresponding to FIG. 2. In this embodiment, a valid MTK ID interval, which is composed of all possible MTK IDs arranged from comparatively small to large, has been specified for both the BMSC and UE in advance. In FIG. 2, Step 201. the BMSC generates a MSK that corresponds to an MSK ID and needs to be transmitted to the UE.

Step 202. the BMSC generates an MTK ID interval that is valid to the MSK generated in step 201.

Step 203. the BMSC transmits the MSK and the MSK ID generated in step 201 and the MTK ID interval generated in step 202 to the UE.

Step 204. the BMSC judges whether or not the MSK of step 203 is used continually. If "Yes", the BMSC goes to step 205; otherwise, the BMSC goes to step 207;

Step 205. the BMSC generates a MTK that corresponds to an MTK ID and needs to be transmitted to the UE. The transmission of this MTK is encrypted with the MSK mentioned in step 204 and this MTK ID of MTK is in a valid MTK ID interval of the MSK.

Step 206. the BMSC transmits the MTK and MTK ID mentioned in step 205 to the UE after they have been encrypted with the MSK.

Step 207. the BMSC generates a MTK that corresponds to an MTK ID and needs to be transmitted to the UE. The transmission of this MTK is encrypted with the MSK mentioned in step 204 and the MTK ID of this MTK is beyond the valid MTK ID interval of MSK. Specified by both the BMSC and UE in advance, this MTK is actually useful or useless.

Step 208. the BMSC transmits the MTK and MTK ID mentioned in step 205 to the UE after they have been encrypted with the MSK.

In FIG. 3,

Step 301. the UE receives and saves the MSK from the BMSC.

Step 302. the UE saves the MTK ID interval that is valid to the MSK in step 301.

Step 303. the UE obtains the MTK ID after it receives the MTK encrypted with the MSK of step 301.

Step 304. the UE checks whether or not the MTK ID of step 303 is in the MTK ID interval of step 302. If "Yes", the UE goes to step 305; otherwise, the UE goes to step 306.

Step 305. the UE accepts the MTK of 303 for subsequent processes.

Step 306. the UE deletes the MSK of step 301 and according to the agreement specified in advance between the UE and BMSC and whether the MTK is actually useful or useless, it accepts or refuses the MTK of 303 for subsequent processes.

What is claimed is:

1. A method for managing keys in Multimedia Broadcast/Multicast service (MBMS), the method comprising steps of:
- generating, by a Broadcast and Multicast Service Center (BMSC), an MBMS Service Key (MSK) that corresponds to an MSK IDentifier (ID) and is to be transmitted to a User Equipment (UE);
- defining, by the BMSC, a valid MBMS DaTa Key (MTK) ID interval for each generated MBMS Service Key (MSK) and sending the valid MTK ID interval to the UE along with the MSK;
- after receiving the MSK, saving the valid MTK ID interval of the MSK by the UE;
- defining, by the BMSC, an MTK ID for each generated MTK; and
- sending, by the BMSC, the MTK ID and the MTK to the UE, after encrypting them with the MSK,
- wherein the UE deletes the saved MSK, if the MTK ID of the MTK is not in the valid MTK ID interval, and
- wherein the UE saves the MTK for subsequent processes, if the MTK ID of the MTK is in the valid MTK ID interval.

2. The method according to claim 1, wherein the UE deletes the MTK.

3. The method according to claim 1, wherein the UE saves the MTK for subsequent processes.

4. The method according to claim 1, wherein said valid MTK ID transmission interval is an interval composed of all possible MTK IDs except some specific one.

5. The method according to claim 4, wherein said specific MTK ID is "0".

* * * * *